US010903894B1

(12) United States Patent
Dash et al.

(10) Patent No.: US 10,903,894 B1
(45) Date of Patent: Jan. 26, 2021

(54) MOBILE WIRELESS REPEATER

(71) Applicant: Quantenna Communications, Inc., Fremont, CA (US)

(72) Inventors: Debashis Dash, Newark, CA (US); Bahador Amiri, Saratoga, CA (US)

(73) Assignee: QUANTENNA COMMUNICATIONS, INC., San Jose, CA (US)

( * ) Notice: Subject to any disclaimer, the term of this patent is extended or adjusted under 35 U.S.C. 154(b) by 258 days.

(21) Appl. No.: 15/635,179

(22) Filed: Jun. 27, 2017

(51) Int. Cl.
| H04B 7/14 | (2006.01) |
| H04L 1/00 | (2006.01) |
| H04L 5/00 | (2006.01) |
| H04L 27/26 | (2006.01) |
| H04W 84/12 | (2009.01) |
| H04W 88/08 | (2009.01) |

(52) U.S. Cl.
CPC ............. *H04B 7/14* (2013.01); *H04L 1/0003* (2013.01); *H04L 5/006* (2013.01); *H04L 27/2601* (2013.01); *H04W 84/12* (2013.01); *H04W 88/08* (2013.01)

(58) Field of Classification Search
None
See application file for complete search history.

(56) References Cited

U.S. PATENT DOCUMENTS

| 8,649,747 | B1 * | 2/2014 | Emmanuel | ............. H01Q 21/24 455/101 |
| 9,594,372 | B1 | 3/2017 | Sills et al. | |
| 9,653,800 | B2 | 5/2017 | Norin | |
| 2005/0256963 | A1 * | 11/2005 | Proctor, Jr. | ........ H04B 7/15528 709/230 |
| 2007/0060048 | A1 * | 3/2007 | Kang | .................... H04W 88/04 455/13.1 |
| 2007/0061041 | A1 | 3/2007 | Zweig | |
| 2008/0159133 | A1 * | 7/2008 | Yeung | ................... H04W 28/10 370/230 |
| 2008/0212491 | A1 * | 9/2008 | Gabara | .................. H04B 7/155 370/254 |
| 2011/0218014 | A1 | 9/2011 | Abu-Qahouq | |

(Continued)

FOREIGN PATENT DOCUMENTS

| CN | 106095565 A | * 11/2016 |
| KR | 20090002363 A | * 1/2009 |

*Primary Examiner* — Noel R Beharry
*Assistant Examiner* — Richard Schnell
(74) *Attorney, Agent, or Firm* — Maschoff Brennan

(57) ABSTRACT

Methods and systems for operating a mobile wireless repeater station for wireless communication on a wireless local area network (WLAN) having a wireless access point (WAP) and a plurality of stations at a location of the WAP. An example implementation includes components coupled to one another to performs operations including sniffing communications channels to intercept communication packets; identifying a subset of one or more relay candidates among the stations to optimize for a relay of subsequent communications based on the intercepted communication packets; and spatially mapping the location of the WAP to determine an optimal spatial placement for the mobile wireless repeater station between the WAP and the identified subset of relay candidates. In an example, the mobile wireless repeater station is adjusted based on the optimal spatial placement.

32 Claims, 3 Drawing Sheets

(56) References Cited

U.S. PATENT DOCUMENTS

| | | |
|---|---|---|
| 2013/0147429 A1 | 6/2013 | Kirby et al. |
| 2013/0288600 A1 | 10/2013 | Kuulilinna et al. |
| 2014/0075189 A1* | 3/2014 | Abraham .............. H04W 88/08 |
| | | 713/168 |
| 2014/0304086 A1* | 10/2014 | Dasdan .............. G06Q 30/0275 |
| | | 705/14.71 |
| 2017/0047782 A1 | 2/2017 | Shevde et al. |
| 2017/0140349 A1 | 5/2017 | Ricci |
| 2017/0214702 A1* | 7/2017 | Moscovici ........ H04W 12/1205 |
| 2017/0353961 A1* | 12/2017 | He ...................... H04W 72/082 |
| 2018/0329617 A1* | 11/2018 | Jones ................. G06F 3/04847 |

* cited by examiner

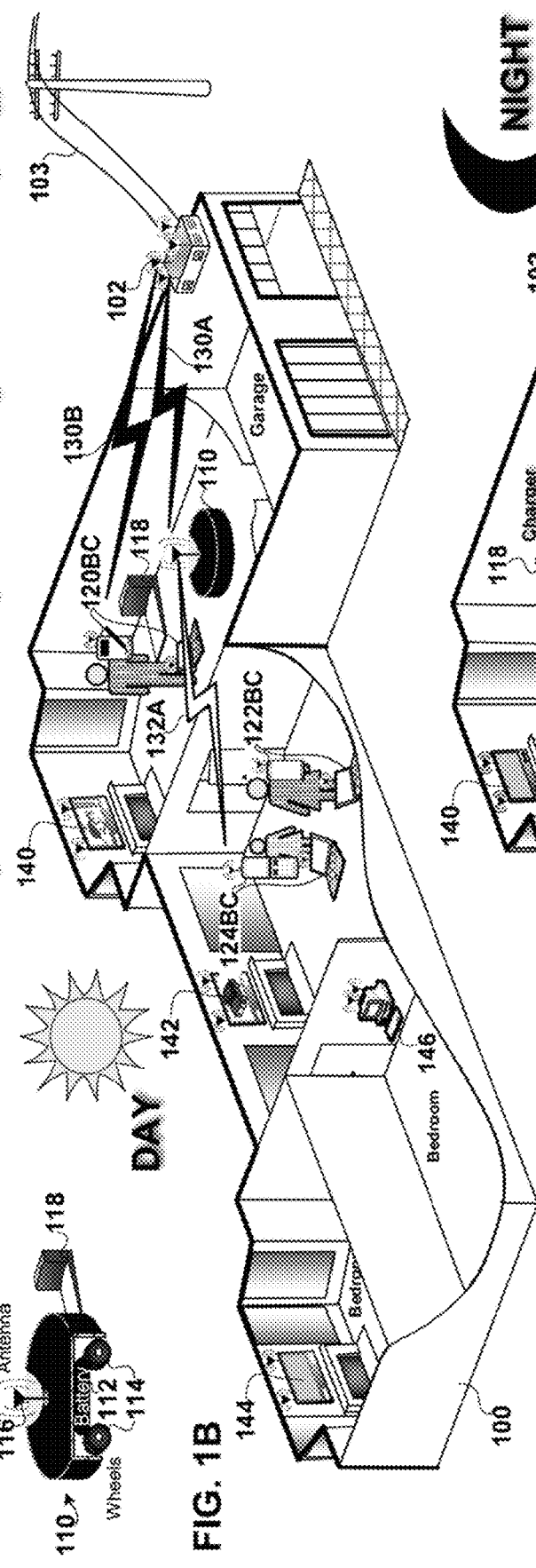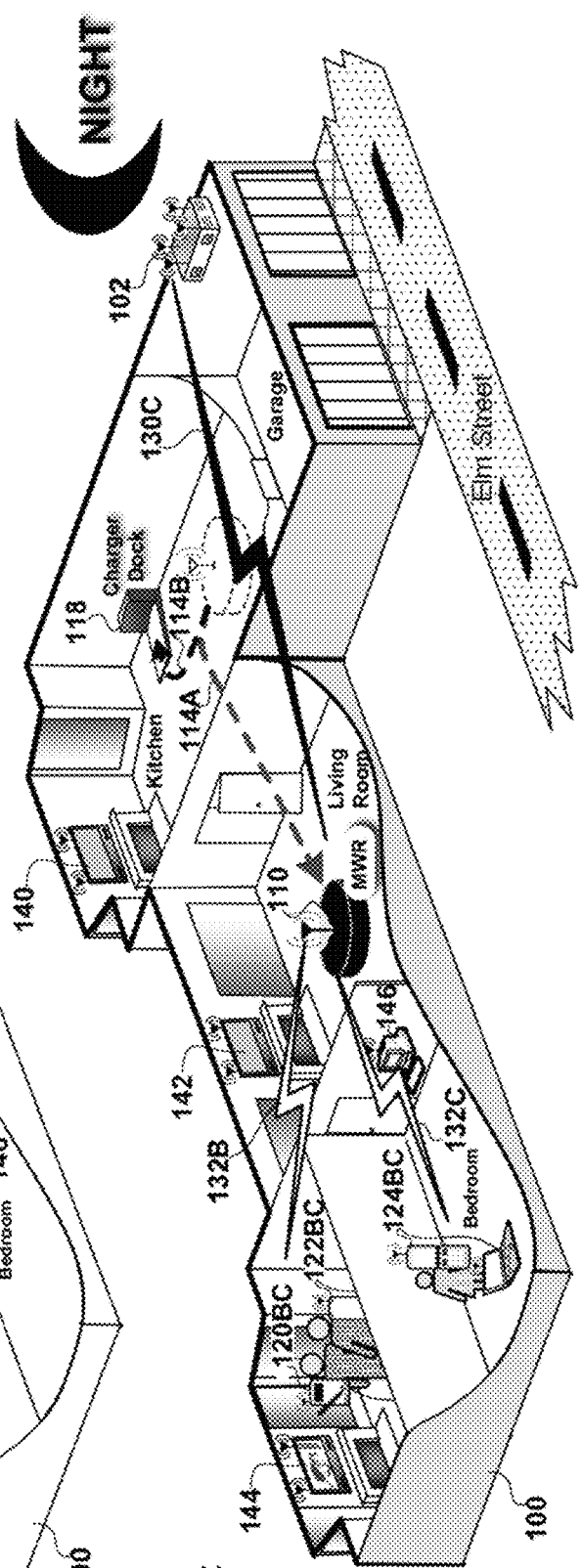

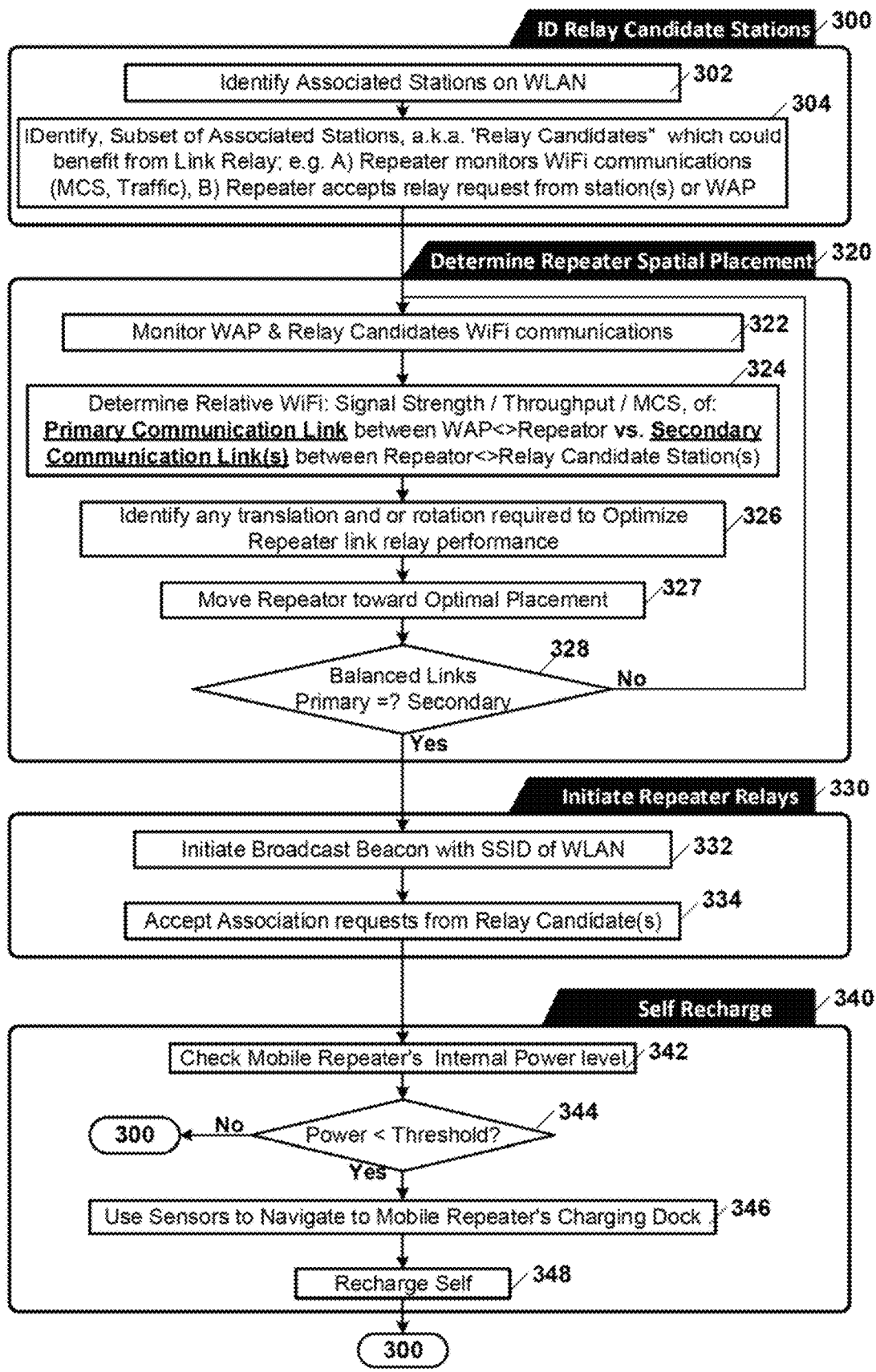
FIG. 3  Method for Operating a Mobile Wireless Repeater

MOBILE WIRELESS REPEATER

BACKGROUND OF THE INVENTION

1. Field of Invention

The field of the present invention relates in general to wireless local area networks including wireless access points (WAP) and wireless stations.

2. Description of the Related Art

Home and office networks, a.k.a. wireless local area-networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras, smoke detectors, door locks, temperature controls, etc. to one another and to the Cable or Subscriber Line through which Internet, video, and television is delivered to the home. Most WAPs implement the IEEE 802:11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random-access methodology for sharing a single communication medium, by having a contending communication link back off and retry access a prospective collision on the wireless medium is detected. i.e. If the wireless medium is in use.

Communications on the single communication medium are identified as "simplex" meaning, one communication stream from a single-source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

Starting with the IEEE 802.11ax standard two or more of the associated stations can uplink concurrently to the WAP using either the same set of orthogonal frequency division multiplexed (OFDM) tones, a.k.a. MU-MIMO uplink, or distinct set of OFDM tones, a.k.a. an orthogonal frequency division multiplexed access (OFDMA) uplink.

What is needed are improved methods for operating each WAP and its associated stations.

SUMMARY OF THE INVENTION

The present invention provides a method and apparatus for a mobile one among the stations on a wireless local area network (WLAN) to relay communication links of other stations on the WLAN.

In an embodiment of the invention a wireless repeater station for wireless communications on a selected communication channel of a wireless local area network (WLAN) having a wireless access point (WAP) and a plurality of stations associated with the WAP is disclosed. The wireless repeater station includes: at least one antenna, a plurality of components a relay candidate identifier circuit, and a spatial placement optimizer circuit. The plurality of components are coupled to one another to form transmit and receive chains coupled to the at least one antenna for wireless communications on the OFDM tones of the selected communication channel. The relay candidate identifier circuit is coupled to the plurality of components to identify based on WLAN communications any among the plurality of stations experiencing wireless communication constraints as 'relay candidates' for a relay of subsequent communications with the WAP by the wireless repeater station. The spatial placement optimizer circuit is coupled to the relay candidate identifier circuit to determine an optimal spatial placement for the wireless repeater station to relay communications between the WAP and the relay candidates identified by the relay candidate identifier circuit.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-C are respectively; a cross-sectional view of the wireless repeater station and plan views of a residential wireless local area network (WLAN) including the mobile wireless repeater station, during day and nighttime;

FIG. 3 is a process flow diagram of processes associated with operating the mobile wireless repeater station.

DETAILED DESCRIPTION OF THE EMBODIMENTS

Figure 2:
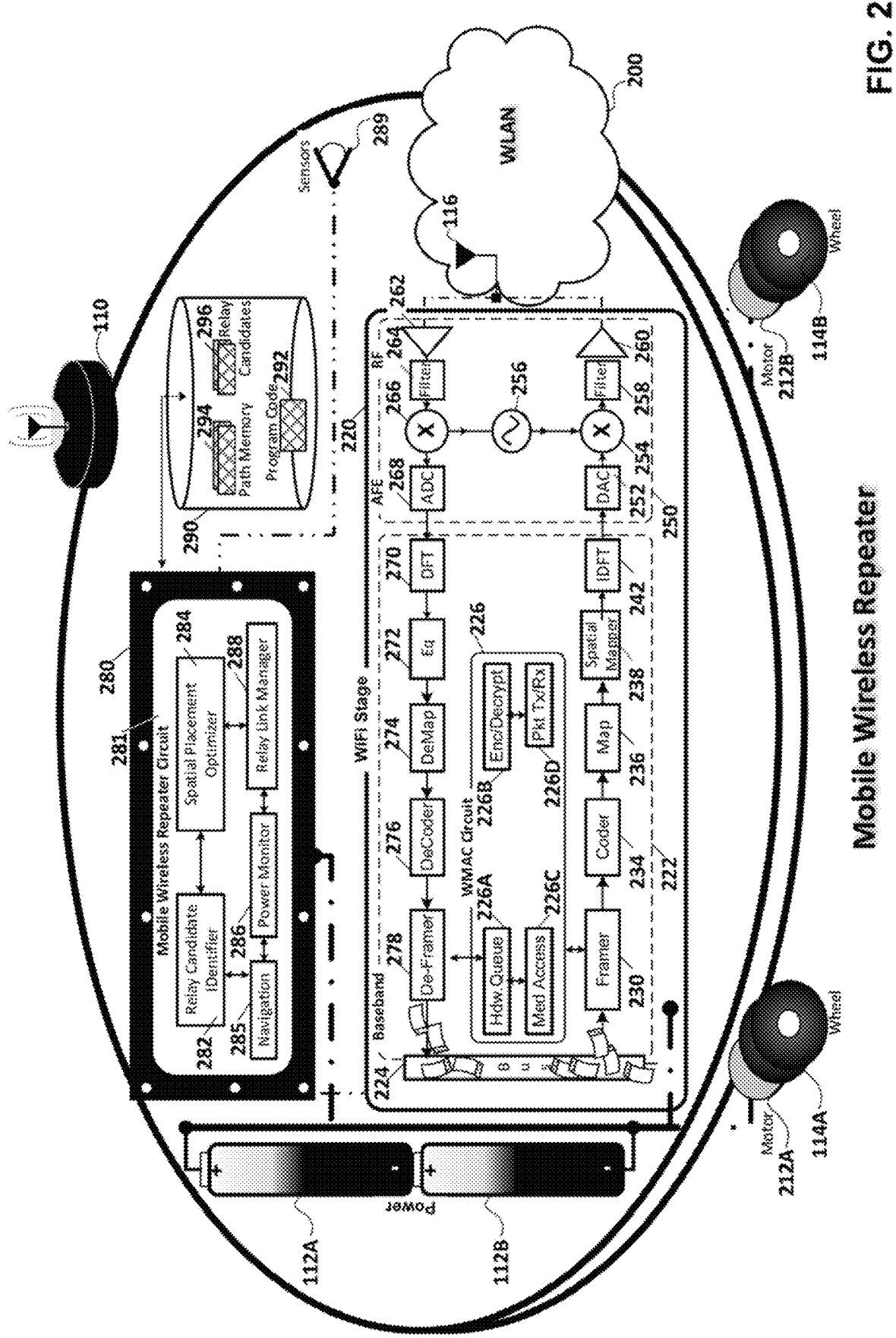
FIG. 2 is a detailed hardware block diagram of the mobile wireless repeater station.

FIGS. 1A-C are respectively; a cross-sectional view of the wireless repeater station and plan views of a residential wireless local area network (WLAN) including the Mobile Wireless Repeater Station (MWRS), during day and nighttime.

In FIG. 1A a cross-sectional view of the MWRS 110 is shown. The MWRS includes: a battery 112 motorized wheels 114, and one or more WiFi antenna 116. The MWRS 110 changes its location throughout the day to stay in the 'center' of the active WLAN stations and more particularly those stations, a.k.a. 'relay-candidates' which may be experiencing difficulty communicating directly with the WAP, and to serve as a relay for those stations' communications with the WAP. The MWRS returns on an as needed basis to its charging dock 118 to charge up Its battery, before returning to service as a WiFi relay, bridge, or repeater.

FIGS. 1B-C are plan views of a residential wireless local area network (WLAN) which includes the MWRS 110 at different times of the day. The WLAN in home 100 is provided by WAP 102 to its associated fixed and mobile stations. The WAP provides these stations-access to the internet via a Telco digital subscriber line (DSL) 103. The associated fixed wireless stations include: TV stations 140, 142, 144 in the kitchen, living room, and master bedroom respectively and a wireless desktop computer 146 in the child's bedroom. The mobile wireless stations include the MWRS, cellphones and notebook computers. Mom owns two portable wireless stations: i.e. her cellphone 122B and her notebook computer 122G. Dad owns two portable wireless stations: i.e. his cellphone 120B and his notebook computer 120C. Their daughter has two personal portable wireless stations: i.e. her cellphone 124B and her notebook computer 124C. The family members tend to keep these portable devices with them as they move throughout the home. The MWRS 110 changes its location throughout the day to stay in the 'center of mass' of the active WLAN stations and more particularly those stations, a.k.a. 'relay candidates' which may be experiencing difficulty communicating directly with the WAP, and to serve as a relay for those stations' communications with the WAP.

FIG. 1B shows-WLAN topology and distribution of family members during the daytime on a typical Saturday afternoon with most of the active WLAN stations located in the kitchen and living room close to the WAP 102. The fixed wireless TV station 144 and the wireless desktop computer 146 in the bedrooms are not active at this time of day. Dad is shown in the kitchen watching his favorite football team on TV 140, intermittently keeping up with his fantasy football team on notebook computer 120C and video chatting with his buddies on mobile phone 120B. Mom and Sis are shown in the living room watching their favorite soccer team on TV 142, intermittently keeping up with their favorite players personal websites on notebook computers 122C and 124C and video chatting with their friends on their mobile phones 122B and 124B. The mobile wireless repeater in FIG. 1B is shown in the kitchen midway between the garage where the WAP 102 is located and the living room where fixed wireless TV 142 and the mobile stations 124BC and 122BC belonging to Sis and Mom-respectively are located. The MWRS 110 changes its location throughout the day to stay in the 'center' of the active WLAN stations and more particularly those stations, a.k.a. 'relay candidates' which may be experiencing difficulty communicating directly with the WAP, and to serve as a relay for those stations' communications with the WAP. MWRS 110 has a charging dock 118 plugged into a wall outlet (not shown) in the kitchen for recharging its integral power source, e.g. battery 112. The mobile wireless repeater 110 automatically returns to its charging dock on an as needed basis. In an embodiment of the invention the return of the mobile wireless repeater 110 to its charging dock is accomplished by its homing in on an infrared beacon (not shown) emitted by charging dock 118. The wireless repeater has identified Mom's and Sis's mobile devices as having poor communication links with the WAP, and has taken over the task of serving as a relay, bridge or repeater for those communications with the WAP. The wireless repeater is shown relaying the communications between the WAP and Sis's cellphone 124B and notebook computer 124C over links 130A, 132A. Dad has a direct link for his cellphone 120B and notebook computer 120C with the WAP 102 over communication link 130B.

FIG. 1C shows WLAN topology and distribution of family members on a typical Saturday night with most of the active WLAN stations located in the bedrooms far from the WAP 102 in the garage. The fixed wireless TV stations 140-142 in the kitchen and living room are not active at this time of day. Dad and Mom are shown in the master bedroom watching their favorite movie on wireless TV 144, and Intermittently using their cell phones 120B, 122B for participating in the chat groups they enjoy. Sis is shown in her bedroom watching her favorite singer song-writer on notebook computer 124C, and intermittently keeping up with her classmates via chat on her cell phone 124B. In response to this shift in WLAN topology the mobile wireless repeater has changed its position from the kitchen to the living room along path 114A. Before making the transition, the mobile wireless station may return along path 114B to the charger dock 118 to replenish its internal power source, e.g. battery 112. The mobile wireless repeater is shown in the living room between the garage where the WAP 102 is located and the bedrooms where fixed wireless TV 144 and the mobile stations 120BC, 122BC and 124BC belonging to Dad, Mom, and Sis respectively are located. The wireless repeater has identified Dad's, Mom's and Sis's mobile devices as having poor communication links with the WAP, and has taken over the task of serving as a relay, bridge or repeater for those devices to communicate with the WAP. The wireless repeater is shown relaying the communications between the WAP and Sis's cellphone 124B and notebook computer 124C over links 130C, 132C. The wireless repeater is shown relaying the communications between the WAP and Mom's and Dad's cellphones 120B, 122B over links 130C, 132B.

NAVIGATION: The MWRS 110 moves toward the target station 104 along a path 116 which avoids obstacles and increases the RSSI of the communications from the target station as monitored by the MWRS. In another embodiment of the invention auxiliary sensors, e.g. Light Detection and Ranging (Lidar) sensor, image sensor, mechanical bumper sensor, infrared (IR) sensor, GPS sensor, etc. may be used to complement the WiFi based navigation of the MWRS toward its optimal placement between the WAP and the relay candidate(s) or on its return path to its charging dock. In another embodiment of the invention the relay candidate station(s) and MWRS may utilize their WiFi capabilities to directly communicate with one another to assist in the navigation. In another embodiment of the invention the path metrics for paths 114A-B may be entered by the homeowner into the MWRS via an online application. When ground based MWRS 110 has reached a position between the relay candidate stations and the WAP it initiates the relay of the corresponding wireless communications.

When the MWRS 110 detects that the energy level of its internal power component. e.g. battery, capacitor, etc falls below a threshold level it returns to its charger dock 118. In an embodiment of the invention the return navigation Is made by the mobile-wireless repeater tracking an Infrared (IR) homing beacon emitted by the charger dock. In an embodiment of the invention where the charger dock itself has WiFi capability, the return is made by the mobile wireless repeater tracking the RSSI or power of the charger dock to move to the docking position at which the RSSI is maximized. The charger dock may have wired or wireless Interface for recharging the mobile wireless repeater. Once the mobile repeater is recharged it is ready to resume its role as a wireless relay for WLAN communications between the WAP and those stations which do not have a good communication link directly with the WAP, a.k.a. the 'relay candidates'.

In an embodiment of the invention the wireless repeater station operates as a household robot, not only to perform the wireless charging described herein, but also additional household tasks without departing from the scope of the claimed invention. In another embodiment of the invention the MWRS operates also as a mobile wireless recharger, with the capability of wirelessly recharging any stations in the home that have a wireless recharging capability.

In an embodiment of the invention the WLAN operates as a MESH network with more than one WAP communicating with its subset of the associated stations and with the MWRS relaying communications between a relay candidate and the corresponding one of the WAPs, without departing from the scope of the claimed invention.

FIG. 2 is a detailed hardware block diagram of the Mobile Wireless Repeater Station 110 in accordance with an embodiment of the invention. The ground based MWRS includes: a WiFi stage 220 which couples the MWRS to the WLAN; an integral power component 112A-B which energizes all components and circuits of the MWRS; a mobility component, e.g. motor and wheel sets 212A & 114A, 212B & 114B which move the MWRS throughout the home or business; optional sensors 289 for proximity and obstacle detection; a very large scale integrated (VLSI) processor 280 for instantiating a mobile wireless repeater circuit for controlling the operation of the MWRS; and non-volatile memory or storage 290 for storing the program code 292 executed by the processor. In another embodiment of the MWRS can include multiple WiFi radios to enable full duplex relay between the WAP and the relay candidate(s). In another embodiment of the Invention the relay candidate and the MWRS can use alternate wireless communication protocols, including but not limited to: Bluetooth, Zigbee, Thread, etc.

The mobile wireless repeater circuit 281 in an embodiment of the invention is instantiated by the VLSI processor 280 executing of program code 292 stored on memory 290. The mobile wireless charging circuit includes: a relay candidate identification circuit 282 for identifying which stations, a.k.a. 'relay candidates' on the WLAN are experiencing wireless communication constraints such as low throughput, low Modulation and Coding Schema (MCS) or high Packet Error Rate (PER); a spatial placement optimizer circuit 284 for optimizing the location of the MWRS for relaying communications between the WAP and the relay candidates; a navigation circuit 285 to control movement of the MWRS to the optimal locations throughout the day for relaying communications of the relay candidates, and to the charging dock for self recharging as needed; a power monitor circuit 288 for determining when the MWRS needs to recharge itself at its charger dock, and a relay link manager circuit 288 for managing the relay of communications between the WAP and the relay candidates.

WiFi:

The WiFi stage 220 includes a plurality of shared and discrete components which make up the transmit and receive chains coupled to antenna 116. In an embodiment of the invention the WiFi stage may include a MIMO array of antenna each with corresponding transmit and receive paths. The WiFi stage includes a baseband circuit 222 and analog front end (AFE) and radio frequency (RF) circuit 250 and the antenna 116. The WiFi stage provides wireless communications for the MWRS on the WLAN 200 in home 100.

WiFi Transmission:

The transmit chain baseband portion 222 includes the following discrete and shared components. Data to be transmitted on the packet based bus 224 is initially processed by the WiFi medium access control (WMAC) component 226. The WMAC includes: hardware queues 226A for each received and transmitted communication stream; encryption and decryption circuits 2268 for encrypting and decrypting the transmitted and received communication streams; medium access circuit 226C for making the clear channel assessment (CCA), exponential random backoff and re-transmission decisions; and a packet processor circuit 226D for packet processing of the communication streams. Each sounding or data packet for wireless transmission on the transmit path components to the WAP is framed in the framer 230. Next the transmit stream is encoded and scrambled in the encoder and scrambler 234 followed by interleaving and mapping in the interleaver mapper 236. Next the transmission is spatially mapped in the spatial mapper 238. The spatially mapped stream(s) from the spatial mapper are input to Inverse Discrete Fourier Transform (IDFT) component 242 for conversion from the frequency to the time domain and subsequent transmission in the AFE and RF stage 250.

The IDFT is coupled to a corresponding one of the transmit chain components in the AFE/RF stage 250. Specifically, the IDFT couples to the digital-to-analog converters (DAC) 252 for converting the digital transmission to analog, upconverters 254, coupled to a common voltage controlled oscillator (VCO) 256 for upconverting the transmission to the appropriate center frequency of the selected channel(s), filter 258, e.g. bandpass filter, for controlling the bandwidth of the transmission, and power amplifier 260 coupled to antenna(s) 124.

WiFi Reception:

The receive chain includes the following discrete and shared components. Received communications on the MWRS's WiFi antenna 124 are subject to RF processing including down conversion in the AFE-RF stage 250. The receive chain Includes the following discrete and shared components: low noise amplifier (LNA) 262 for amplifying the received signal under control of an analog gain control (AGC) (not shown) for setting the amount by which the received signal is amplified; filter 264 for bandpass filtering the received signals; downconverter 266 coupled to the VCO 256 for downconverting the received signals; analog-to-digital converter (ADC) 268 for digitizing the downconverted signals. The digital output from each ADC is passed to the baseband stage 222 and specifically the discrete Fourier transform (DFT) component 270 for-conversion from the time to the frequency domain. The equalizer 272 accepts input from the DFT and mitigates channel impairments thereon converting the received communication on the chain into a distinct communication stream at the output. Next the demapper deinterleaver 274 converts the received symbol to bits which are deinterleaved. The decoder 276 decodes the received communication, and the de-framer 278 deframes it. The received communication is then passed to the WMAC component 226 where it is decrypted with the decryption circuit 2268 and placed in the appropriate receive hardware queue 226A for transfer to the packet based bus 224.

The WiFi stage 220 is coupled to the mobile wireless repeater circuit 281 to enable the relay candidate identification circuit 282 to determine which if any of the associated stations on the WLAN are experiencing communication constraints in their communications directly with the WAP and could thus benefit from a relay of those communications via the WMRS instead. Communication constraints such as low throughput, low Modulation and Coding Schema (MCS) or high Packet Error Rate (PER), can be determined either directly by the MWRS sniffing the communications between each station with the WAP or by direct communication with the WAP or stations themselves. In another embodiment of the invention, the relay candidate identification circuit bases-its selection on information received from the WAP. In another embodiment of the invention the relay candidate identification circuit 282 retains a history of the communication constraints at different times of day for each of the relay candidates and correlates this information into candidate records 296 which is also stored in memory 290. In another embodiment of the invention, this history information ca be obtained from the WAP or a cloud server.

The WiFi stage 220 is also coupled to the relay location optimization circuit 284 for optimizing the spatial placement, e.g. location and or orientation, of the MWRS for relaying communications between the WAP and the relay candidates. In an embodiment of the invention this optimization involves the determination of relative WiFi signal strength, or throughput or MCS of the primary communication link between the WAP and the MWRS versus one or more secondary links between the MWRS and a relay candidate station and the identification of any translation and or rotation of the MWRS required to optimize the MWRS's link relay performance. Movement of the MWRS to the optimal spatial placement may be accomplished: in a single step or incrementally; with movement, sniffing and evaluation of link performance evaluated at each step. Movement of the MWRS to the optimal spatial placement may be complemented with user input as to acceptable locations within the home or business structure from which the MWRS can select the optimum location. In another embodiment of the invention the location is optimized based on the link qualities of the WAP to Mobile relay station link and Mobile relay station to relay candidate link. In another embodiment of the invention, the location is optimized based on the amount of traffic and airtime used by each relay candidate, their current link quality and the expected link quality with the Mobile Wireless Relay Station.

The navigation circuit 285 is also coupled to the WiFi Stage to monitor the RSSI or power of received communications of the WAP and relay candidate stations and move the MWRS in a direction which maximizes the relayed communications therebetween. In an embodiment of the invention the navigation circuit 28 includes the capability of deriving path metrics to each of identified stations as well as the charging dock in memory 290 and of storing these metrics in path memory tables 294 in memory 290. In another embodiment of the invention the navigation circuit includes obstacle detection and avoidance capabilities provided by the WiFi stage, and or the sensors.

The optional sensors 289 may complement the existing WiFi based navigational capabilities of the MWRS, in which Instance they are coupled to the navigation circuit 285. Optional sensors may include: Light Detection and Ranging (LIDAR), Charge Coupled Device (CCD), mechanical bumper, Infrared (IR), Global Positioning System (GPS), etc.

The relay link manager 288 also couples to the WiFi stage to handle the relay of communications between the WAP and each relay candidate station. Once the MWRS has arrived at an optimal spatial placement it initiates a broadcast beacon with the Service Set Identifier (SSID) of the WLAN, and accepts association requests from the relay candidates, and relays subsequent communications between each relay candidate and the WAP.

The integral power component in an embodiment of the Invention, comprises batteries 112A-B which energize all components and circuits of the MWRS via electrical connections thereto. This power component is rechargeable and is recharged as needed by autonomous return of the MWRS to the recharging dock under control of the navigation circuit 285. The determination of when self-recharging of the MWRS is required is determined by the power monitor circuit 286 which Is coupled to the power component.

Mobility of the ground based MWRS is provided by the mobility component, e.g. motor and wheel pairs 212A & 114A and 212B & 114B. Energy is supplied to the motors from the power component, with each motors rotation, e.g. rate and direction, controlled by the navigation circuit 285.

FIG. 3 is a process flow diagram of processes associated with operating the mobile Wireless repeater station. Processing begins with the block 300 of processes involved in the identification of relay candidate stations. In process 302 the MWRS identifies associated stations on the WLAN. This process Involves the sniffing of WLAN communications between each station and the WAP to determine the MAC address and capabilities of each station as well as the load and performance of each corresponding communication link. Capabilities determination is made during a capabilities exchange between the WAP and each station, such as that which is part of the IEEE 802.11 standard. In another embodiment of the invention the WAP passes the MAC address, capabilities, load and performance of each associated station directly to the MWRS. In still another embodiment of the invention the MWRS communicates directly with each station to determine this information. Next in process 304 the subset of associated stations, a.k.a. 'relay candidates' which are experiencing communication constraints e.g. low throughput, low MCS, or high PER are identified from the information accumulated in the prior step either via sniffing of WLAN communications or by direct communication of the information from the WAP or stations. Control is then passed to the block 320 of processes associated with determining the optimal spatial placement of the MWRS for relaying communications between the WAP and the relay candidate(s).

The block 320 of processes associated with determining the optimal spatial placement of the MWRS for relaying communications between the WAP and the relay candidate(s) begins with process 322 in which WAP and relay candidates WiFi communication links are monitored by the MWRS for signal strength, throughput and or MCS. In process 324 one or more of the throughput, MCS, airtime, packet error rate (PER) and signal strength parameters are determined for the primary communication link between the WAP and the MWRS versus the secondary communication link(s) between the MWRS and the relay candidate station(s). Next in process 326 any translation and or rotation of the MWCS required to optimize the MWRS's link relay performance is determined. In an embodiment of the invention the determination of spatial placement involves moving in a direction in which the relative signal strength, throughput and or MCS of the primary and secondary communication relay links are balanced. In process 327 the mobility component, e.g. motorized wheels, on the MWRS are under control of the navigation circuit 285 (See FIG. 2) used to move the MWRS to the required location. Next in decision process 328 a determination is made as to whether the primary and secondary relay communication links are in balance as to at least one of: signal strength, throughput, or MCS. If not then control returns to process 322 for another iteration of the special placement optimization process. Alternately, if the primary and secondary relay communication links are balanced then control passes to the next block of processes in which relay links are established.

The block 330 of processes associated with initiating and managing relay of communication links between the WAP and the relay candidate stations begins with process 332. In process 332, the arrival of the MWRS at an optimal spatial placement initiates the transmission by the MWRS of a broadcast beacon with the Service Set Identifier (SSID) of the WLAN. Next in process 334 the MWRS accepts association requests from the relay candidates, and relays subsequent communications between each relay candidate and the WAP. Control is then passed to the block 340 of processes involved in recharging the MWRS.

The self recharging block 340 of processes assures that MWRS itself maintains the charge of its integrated power component, e.g. battery or capacitor at a level sufficient to perform its relay of communication links for the relay candidate stations. In process 342 the MWRS checks its own internal power level to determine whether the internal power level of the MWRS has fallen below a threshold level. If it has not then in decision process 344 control is returned to the block 300 of processes associated with re-evaluating and re-identifying the relay candidate stations. These processes are repeated throughout the day to respond to changes in the topology of the WLAN and to determine the latest subset of relay candidate stations. Alternately, if a determination is made in decision process 344 that the MWRS needs recharging itself, e.g., that its internal power level has fallen below a threshold amount, then control is passed to process 348. In process 346 sensors are used to navigate the MWRS to its charging dock. In an embodiment of the invention an IR sensor on the MWRS may be used to track an IR beacon emitted by the charging dock. In another embodiment of the invention the charging dock may be a station itself and the MWRS uses the RSSI or power of the received communications from the charging dock to aid its return navigation. Next in process 348 the MWRS navigates to the charging dock. Next control is passed to process 348 in which the MWRS is recharged, after which process control returns to process 300.

The components and processes disclosed herein may be implemented in a combination of software, circuits, hardware, firmware, processor executing program code stored in non-volatile memory as integrated with the WAP's existing transmit and receive path components, and without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A mobile wireless repeater station for wireless communication on a wireless local area network (WLAN) having a wireless access point (WAP) and a plurality of stations at a location of the WAP; and the mobile wireless repeater station comprising:
    a plurality of components coupled to one another to form transmit and receive chains coupled for wireless communications on Orthogonal Frequency-Division Multiplexing (OFDM) tones of communication channels;
    a relay candidate identifier circuit coupled to the plurality of components to:
        sniff communications channels by intercepting communication packets at the location of the WAP,
        identify two or more relay candidates to optimize among the plurality of stations for a relay of subsequent communications with the WAP by the mobile wireless repeater station based on the intercepted communication packets, and
        select the two or more relay candidates, wherein each relay candidate of the two or more relay candidates are experiencing communication constraints;
    a spatial placement optimizer circuit coupled to the relay candidate identifier circuit to spatially map the location of the WAP and determine an optimal spatial placement for the mobile wireless repeater station between the WAP and the identified two or more relay candidates identified to relay the subsequent communications, wherein the optimal spatial placement for the mobile wireless repeater station is determined in the aggregate relative to the two or more relay candidates and is based on the communication constraints, wherein determining the optimal spatial placement for the mobile wireless repeater station between the WAP and the identified two or more relay candidates includes analyzing a location in a structure; and
    a mobility component to adjust the mobile wireless repeater station based on the optimal spatial placement.

2. The mobile wireless repeater station of claim 1, further comprising:
    wherein the mobility component is to adjust by varying at least one of: a location, a position and an orientation of the mobile wireless repeater station based on the optimal spatial placement of the spatial placement optimizer circuit, the location including an outside location or the location in the structure.

3. The mobile wireless repeater station of claim 1, further comprising:
    a power recharging component integral with the mobile wireless repeater station to perform wireless charging of one or more of the plurality of stations.

4. The mobile wireless repeater station of claim 1, wherein the relay candidate identifier circuit identifying the two or more relay candidates based on the intercepted communication packets comprise determining one or more stations with at least one of the communication constraints for an associated: link quality, proximity to other relay candidates, a lowest modulation and coding schema (MCS) and communication traffic metrics.

5. The mobile wireless repeater station of claim 1, wherein the spatial placement optimizer circuit to determine a position at which relative signal strengths between the WAP and the mobile wireless repeater, and between the mobile wireless repeater station and the two or more relay candidates substantially equilibrate with one another; and
    wherein the mobility component is to navigate the mobile wireless repeater station to the position.

6. The mobile wireless repeater station of claim 1, further comprising:
    the spatial placement optimizer circuit to determine a position at which the relative Modulation and Coding Schema (MCS) between the WAP and the mobile wireless repeater, and between the mobile wireless repeater station and the relay candidates substantially equilibrate with one another; and
    wherein the mobility component is to navigate the mobile wireless repeater station to the position.

7. The mobile wireless repeater station of claim 1, wherein the mobility component further comprises:
a plurality of sensors to navigate a path of the mobile wireless repeater station to the optimal spatial placement.

8. The mobile wireless repeater station of claim 1, further comprising:
a navigation circuit to navigate the mobile wireless repeater station in a direction based on updating the spatial mapping to maintain a balance of Received Signal Strength Indicator (RSSI) from the WAP with the RSSI from the two or more relay candidates.

9. The mobile wireless repeater station of claim 1, further comprising:
a relay link management circuit coupled to the plurality of components to manage the wireless relay of communications between the WAP and the two or more relay candidates, by broadcasting a beacon with a Service Set Identifier (SSID) of the WAP, and by accepting association requests from candidate stations.

10. The mobile wireless repeater station of claim 1, wherein the optimal spatial placement is selected from among a predetermined set of acceptable spatial placement locations.

11. The mobile wireless repeater station of claim 1, wherein spatially mapping the location of the WAP includes spatially mapping the location in the structure, wherein the optimal spatial placement is within the structure.

12. The mobile wireless repeater station of claim 1, wherein the sniffed communication packets are intercepted between the WAP and at least one station of the plurality of stations.

13. The mobile wireless repeater station of claim 12, wherein the sniffed communication packets include at least one of: a media access control (MAC) address of the at least one station of the plurality of stations, capabilities of the at least one station of the plurality of stations, or a load and performance of a corresponding communication link.

14. A method for operating a mobile wireless repeater station for wireless communication on a wireless local area network (WLAN) having a wireless access point (WAP) and a plurality of stations at a location of the WAP; and the method comprising:
providing a plurality of components coupled to one another to form transmit and receive chains for wireless communications on Orthogonal Frequency-Division Multiplexing (OFDM) tones of communication channels;
sniffing communications channels to intercept communication packets at the location of the WAP;
identifying two or more relay candidates from among the plurality of stations to optimize for a relay of subsequent communications with the WAP by the mobile wireless repeater station based on the intercepted communication packets;
selecting the two or more relay candidates based on each relay candidate of the two or more relay candidates experiencing communication constraints;
spatially mapping the location of the WAP to determine an optimal spatial placement for the mobile wireless repeater station between the WAP and the identified two or more relay candidates to relay the subsequent communications, wherein determining the optimal spatial placement for the mobile wireless repeater station between the WAP and the identified two or more relay candidates includes analyzing a location in a structure; and
controlling the mobile wireless repeater station to adjust based on the optimal spatial placement.

15. The method of claim 14, wherein controlling the mobile wireless repeater station to adjust comprises varying at least one of a location, a position and an orientation of the mobile wireless repeater station based on the optimal spatial placement, location including an outside location or the location in the structure.

16. The method of claim 14, wherein the mobile wireless repeater station comprises a power component integral with the mobile wireless repeater station to perform wireless charging of one or more of the plurality of stations.

17. The method of claim 14, wherein identifying the two or more relay candidates based on the intercepted communication packets comprises determining one or more stations with at least of the communication constraints for an associated: link quality, proximity to other relay candidates, a lowest modulation and coding schema (MCS) and communication traffic metrics.

18. The method of claim 14, wherein spatially mapping the location of the WAP comprise determining a position at which relative signal strengths between the WAP and the mobile wireless repeater, and between the mobile wireless repeater station and the two or more relay candidates substantially equilibrate with one another; and
wherein controlling the mobile wireless repeater station comprises navigating the mobile wireless repeater station to the position.

19. The method of claim 14, wherein spatially mapping the location of the WAP comprises determining a position at which the relative Modulation and Coding Schema (MCS) between the WAP and the mobile wireless repeater, and between the mobile wireless repeater station and the two or more relay candidates substantially equilibrate with one another; and
wherein controlling the mobile wireless repeater station comprises navigating the mobile wireless repeater station to the position.

20. The method of claim 14, wherein controlling the mobile wireless repeater station comprises navigating the mobile wireless repeater station to the optimal spatial placement using sensors.

21. The method of claim 14, wherein controlling the mobile wireless repeater station comprises navigating the mobile wireless repeater station in a direction based on updated spatial mapping to maintain a balance of the Received Signal Strength Indicia (RSSI) from the WAP with the RSSI from the two or more relay candidates.

22. The method of claim 14, further comprising:
identifying a basic service set (BSS) that is associated with the WAP;
replicating the BSS of the WAP;
broadcasting a beacon with a Service Set Identifier (SSID) of the WAP; and
accepting association requests from candidate stations.

23. The method of claim 14 further comprising:
responsive to the mobile wireless repeater station being adjusted based on the optimal placement, identifying a particular relay candidate that is experiencing communication constraints;
determining a second optimal spatial placement for the mobile wireless repeater station in view of the particular relay candidate that is experiencing communication constraints; and
controlling the mobile wireless repeater station to adjust based on the second optimal spatial placement.

24. The method of claim 23, wherein identifying the particular relay candidate that is experiencing communication constraints comprises determining a history of the communication constraints at different times of day for each of the relay candidates in the two or more relay candidates.

25. The method of claim 14, wherein sniffing communications channels to intercept communication packets at the location of the WAP further comprises generating a profile for each of the plurality of stations based on the intercepted communication packets, wherein identifying the two or more relay candidates from among the plurality of stations further comprises analyzing the profiles for each of the two or more relay candidates to determine historical communication constraints, and wherein selecting the two or more relay candidates is based on the communication constraints in view of historical communication constraints.

26. The method of claim 14, wherein the selecting the two or more relay candidates based on each relay candidate of the two or more relay candidates experiencing communication constraints further comprises correlating the communication constraints in view of historical communication constraints for the each relay candidate of the of the two or more relay candidates.

27. The method of claim 26, wherein the historical communication constraints are obtained from a remote server.

28. The method of claim 14, wherein sniffing communications channels to intercept communication packets at the location of the WAP further comprises transmitting the intercepted communication packets to the remote server to track historical communication constraints for each of the relay candidates.

29. The method of claim 26, wherein the historical communication constraints are obtained from the WAP.

30. The method of claim 14, wherein identifying the two or more relay candidates from among the plurality of stations is in a mesh network.

31. The method of claim 14, wherein the sniffing the communications channels to intercept the communication packets further comprises incrementally moving the mobile wireless repeater station to intercept the communication packets.

32. The method of claim 14, wherein the mobile wireless repeater station sniffs communications channels from multiple locations.

* * * * *